(12) United States Patent
Gravelle et al.

(10) Patent No.: US 11,836,569 B1
(45) Date of Patent: Dec. 5, 2023

(54) VEHICLE TRACKING SYSTEM USING SMART-PHONE AS ACTIVE TRANSPONDER

(71) Applicant: Amtech Systems, LLC, Albuquerque, NM (US)

(72) Inventors: Kelly Gravelle, Poway, CA (US); John Todd Elson, Albuquerque, NM (US); Greg Lantz, Albuquerque, NM (US); Michael Melville, Albuquerque, NM (US); Paul Hamel, Albuquerque, NM (US)

(73) Assignee: AMTECH SYSTEMS, LLC, Albuquerque, NM (US)

( * ) Notice: Subject to any disclaimer, the term of this patent is extended or adjusted under 35 U.S.C. 154(b) by 0 days.

(21) Appl. No.: 17/112,103

(22) Filed: Dec. 4, 2020

Related U.S. Application Data

(60) Provisional application No. 62/944,680, filed on Dec. 6, 2019.

(51) Int. Cl.
| | | |
|---|---|---|
| *G08G 1/017* | (2006.01) | |
| *G06K 7/10* | (2006.01) | |
| *E01F 9/30* | (2016.01) | |
| *H04W 4/80* | (2018.01) | |

(52) U.S. Cl.
CPC ............. *G06K 7/10425* (2013.01); *E01F 9/30* (2016.02); *G08G 1/017* (2013.01); *H04W 4/80* (2018.02)

(58) Field of Classification Search
CPC .......... G06K 7/10425; G06K 7/10297; G06K 7/10465; E01F 9/30; H04W 4/80; G08G 1/017; G08B 13/2491; G08B 13/00; G08B 13/22; G08B 13/24; G08B 13/2494; G08B 13/2497; G08B 13/1663; G01S 5/0273; G01S 5/0284; G01S 13/82; G01S 13/878; G01S 5/0221; G01S 5/0294; G01S 5/04; G06Q 10/087; G06Q 20/203; G06Q 50/28; G06Q 30/06; G07G 1/009; H04B 1/0007; H04Q 2209/47; H04Q 2209/84
See application file for complete search history.

(56) References Cited

U.S. PATENT DOCUMENTS

| | | |
|---|---|---|
| 4,906,938 A | 3/1990 | Konopka |
| 4,908,629 A | 3/1990 | Apsell et al. |
| 5,592,181 A | 1/1997 | Cai |

(Continued)

FOREIGN PATENT DOCUMENTS

| | | | |
|---|---|---|---|
| CN | 108877240 A | * | 11/2018 |
| CN | 110136278 A | * | 8/2019 |

(Continued)

*Primary Examiner* — Hai Phan
*Assistant Examiner* — Anthony D Afrifa-Kyei
(74) *Attorney, Agent, or Firm* — Bradley Arant Boult Cummings

(57) ABSTRACT

A system combining readers for RFID transponders and Bluetooth® devices for for automated roadway tolling and monitoring is described. Because of the ubiquity of Bluetooth® devices, filtering methods are described to narrow received Bluetooth® signals to a particular monitored traffic lane and to further associate the Bluetooth® signal with a registered RFID toll tag in a vehicle. Signal strength of the Bluetooth® signal at each of a plurality of receiver antennas may be used to identify the location of the Bluetooth® device that emitted the signal.

20 Claims, 12 Drawing Sheets

(56) References Cited

U.S. PATENT DOCUMENTS

| | | | |
|---|---|---|---|
| 5,694,322 A | 12/1997 | Westerlage et al. | |
| 5,717,389 A | 2/1998 | Mertens et al. | |
| 5,864,831 A | 1/1999 | Schuessler | |
| 5,917,423 A | 6/1999 | Duvall | |
| 5,973,601 A | 10/1999 | Campana, Jr. | |
| 6,198,528 B1 | 3/2001 | Maynard | |
| 6,653,946 B1 | 11/2003 | Hassett | |
| 6,816,707 B1 | 11/2004 | Barker et al. | |
| 6,876,858 B1 | 4/2005 | Duvall et al. | |
| 6,975,997 B1 | 12/2005 | Murakami et al. | |
| 7,375,648 B1 | 5/2008 | Mulka et al. | |
| 10,134,210 B1* | 11/2018 | Gravelle | H04W 4/80 |
| 10,769,392 B1* | 9/2020 | Gravelle | H04W 4/80 |
| 2003/0146835 A1 | 8/2003 | Carter | |
| 2003/0146852 A1 | 8/2003 | O'Dell | |
| 2003/0189484 A1 | 10/2003 | Rust et al. | |
| 2003/0189498 A1 | 10/2003 | Kakihara et al. | |
| 2004/0075532 A1 | 4/2004 | Ueda et al. | |
| 2004/0119609 A1 | 6/2004 | Solomon | |
| 2004/0203932 A1 | 10/2004 | Yamagishi et al. | |
| 2005/0065779 A1 | 3/2005 | Odinak | |
| 2005/0097018 A1 | 5/2005 | Takida | |
| 2005/0179563 A1 | 8/2005 | Kelley | |
| 2006/0011721 A1* | 1/2006 | Olsen | G06Q 10/087 235/385 |
| 2006/0015394 A1 | 1/2006 | Sorensen | |
| 2006/0200379 A1 | 9/2006 | Biet | |
| 2006/0258367 A1 | 11/2006 | Chiang | |
| 2007/0011040 A1 | 1/2007 | Wright et al. | |
| 2007/0159315 A1 | 7/2007 | Murata et al. | |
| 2007/0275731 A1 | 11/2007 | Alfert et al. | |
| 2008/0258936 A1 | 10/2008 | Chitor et al. | |
| 2008/0280624 A1 | 11/2008 | Wrappe | |
| 2009/0024458 A1 | 1/2009 | Palmer | |
| 2009/0121898 A1 | 5/2009 | Jia et al. | |
| 2009/0184847 A1 | 7/2009 | Kohli et al. | |
| 2010/0076878 A1 | 3/2010 | Burr et al. | |
| 2010/0106567 A1 | 4/2010 | McNew | |
| 2010/0151784 A1 | 6/2010 | Grau Besoli | |
| 2010/0161392 A1 | 6/2010 | Ashby et al. | |
| 2010/0198498 A1 | 8/2010 | Jansen | |
| 2010/0287038 A1 | 11/2010 | Copejans | |
| 2011/0131154 A1 | 1/2011 | Faber et al. | |
| 2011/0071880 A1 | 3/2011 | Spector | |
| 2013/0103200 A1 | 4/2013 | Tucker et al. | |
| 2013/0331120 A1* | 12/2013 | Ranki | H04W 4/02 455/456.1 |
| 2014/0154686 A1 | 6/2014 | Horton et al. | |
| 2014/0236778 A1 | 8/2014 | Villardito | |
| 2014/0314216 A1 | 10/2014 | Penberthy et al. | |
| 2015/0251674 A1 | 9/2015 | Benkert | |
| 2016/0148269 A1* | 5/2016 | Lamont | G06Q 30/0267 705/14.63 |
| 2016/0203651 A1 | 7/2016 | Heath et al. | |
| 2017/0041452 A1 | 2/2017 | Amann | |
| 2017/0042432 A1 | 2/2017 | Adib et al. | |
| 2017/0142543 A1 | 5/2017 | Ossin et al. | |
| 2017/0311228 A1 | 10/2017 | Zavesky et al. | |
| 2017/0372262 A1* | 12/2017 | Haney | G06Q 50/28 |
| 2017/0374641 A1 | 12/2017 | Batra et al. | |
| 2021/0150159 A1* | 5/2021 | Volkerink | B01L 3/5453 |

FOREIGN PATENT DOCUMENTS

| | | |
|---|---|---|
| EP | 1517271 A1 | 3/2005 |
| JP | 2009301555 A * | 12/2009 |

* cited by examiner

VEHICLE TRACKING SYSTEM USING SMART-PHONE AS ACTIVE TRANSPONDER

CROSS REFERENCE TO RELATED APPLICATIONS

This application claims priority under 35 U.S.C. § 119 to U.S. Provisional Patent Application No. 62/944,680 filed on Dec. 6, 2019, entitled "Vehicle Tracking System Using Smart-Phone as Active Transponder," the contents of which are hereby incorporated herein by reference in their entirety.

BACKGROUND

The field of electronic vehicle tracking for tolling and other purposes has seen many iterations over the years. These include the use of vehicle-based backscatter transponders detected and communicated with by roadside equipment, active transponders detected and communicated with by roadside equipment, hybrid transponders having both active and backscatter functions; video monitoring of vehicle license plate and other placards. Cellular telephones have also been described for use in tolling systems, alone or in combination with the aforementioned types of transponders, including in application Ser. No. 13/398,337 by one or more of the present inventors.

One problem in tolling applications that exists regardless of the technology used is determination of the roadway lane in which the vehicle is travelling. This is critical for several reasons. Firstly, because open road tolling systems frequently employ multiple transponder detection antennas and systems to cover multiple lanes of travel, it is necessary to accurately determine lane of travel so that vehicles are not recorded more than once per crossing. Secondly, various tolling and roadway traffic management operations provide incentives and/or restrictions for vehicles of different types and occupancy levels, these include the ability to travel in restricted lanes, thus it is necessary to determine if a vehicle is travelling in the required or allowed lane.

Bluetooth® technology allows for unique identification of electronic devices based on their electronic signature. This identification feature may be used in the transportation industry to monitor traffic flow patterns and identify vehicles that are otherwise unidentifiable, in the case of obstructed license plates and lack of RFID tags.

The present invention is directed to novel approaches to vehicle tracking and tolling using smart phones as active transponders. A smart phone is defined here as a cellular phone that also has capability to load and run application programs (apps) and that has wireless transceivers beyond the radio used to send voice and data to a cellular network.

DETAILED DESCRIPTION

Figure 1:
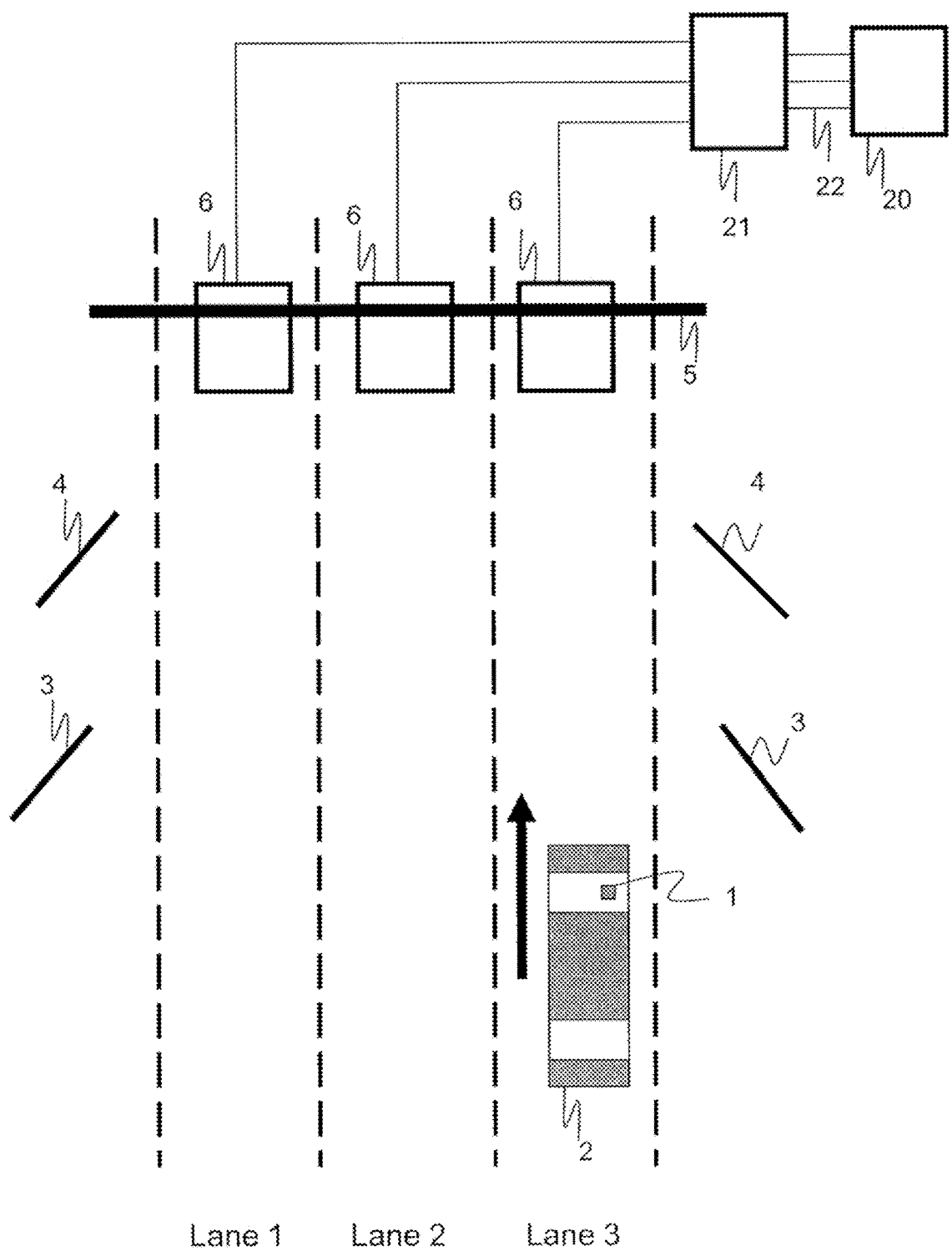
FIG. 1 is a diagram of an exemplary embodiment of the inventive system.
Figure 2:
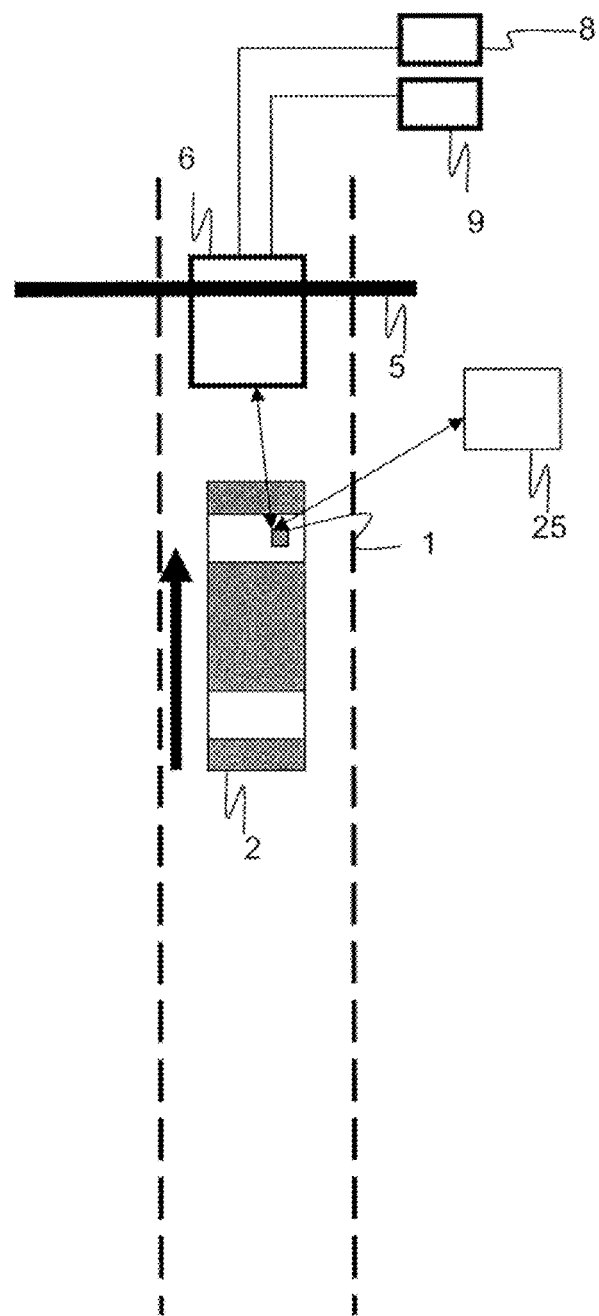
FIG. 2 is a diagram of an exemplary embodiment of the inventive system.

Most generally, the system consists of vehicle-based smart phones interacting with external fixed transceivers mounted over the roadway or beside it. The phones and external transceivers are capable of two-way communications, and both transmit and receive functions can be utilized in the system.

The system concept of operations may take several forms:
- The phone may transmit to the fixed transceiver
- The phone may receive from the fixed transceiver
- There may be two-way communication between the fixed transceiver and phone
- The wireless protocol may be Bluetooth® Low Energy (BLE), IEEE 802.11/WiFi, or an emergent protocol
- A fixed transceiver may utilize a multi-beam antenna
- A fixed transceiver may utilize one or more antennas, each providing a single beam covering a single lane or geographic area
- Determination of the vehicle's lane of travel or area may be computed by:
- A controller in communication with the fixed transceivers, or
- The mobile unit. In this case, the mobile can transmit its lane number or area to a back office via cellular network, WiFi, BLE, RFID, or any other wireless protocol in use in the phone.

Communication Protocols

Standard radio protocols such as WiFi and BLE may be used for the transaction, and in principal any protocol with relevant hardware in the phone may be used subject to practical restrictions inherent in the protocol, hardware, and phone software. WiFi probe requests and BLE advertisements are examples of signal formats that can function as beacons in this system. The system can rely on this message alone for lane determination, or additionally utilize responses to the beacon.

To communicate with the smart phone app, fixed transceivers that utilize WiFi and/or BLE protocols are installed in the lane and connected to appropriate antennas. Messages from the phone contain a unique identifier or ID; these messages can be evaluated for received signal strength indication (RSSI). Lane position or proximate antenna position can be determined at a roadside server connected to the transceivers by Ethernet and TCP/IP or other convenient protocol. When a phone message is received at more than one transceiver across the roadway, the unique identifier, along with the RSSI, are sent to the server.

Alternately, the lane determination may be made by the phone application resident and running on the phone, based on messages sent from the fixed transceivers to the phone.

Phone as Transmitter

In an embodiment, the invention involves configuring a smart phone as an active transponder for vehicle tracking and/or roadway tolling. The smart phone is adapted to transmit a message periodically that contains a known address or identifier. An exemplary system is described with reference to FIGS. 1-4, with like numbers representing the indicated elements. An existing radio supported on the smart phone 1 such as the WiFi radio or the BLE radio is used to generate these signals. Roadside and/or overhead transceivers detect the transmissions to identify the location of the vehicle. The phone must be uniquely associated with data content in the message which is associated with an account used to collect the payment of tolls.

In order to perform this task effectively it is necessary that the phone send messages frequently while within the toll zone. A minimum repetition rate of 10 Hz, or one per 100 milliseconds, is required, but 100 Hz or one per 10 milliseconds is preferred. Depending upon power consumption in this high rep rate mode, it may be necessary to overlay GeoZone functionality, such that the higher rep rate/power consumption mode operates only in the vicinity of toll collection zones, thus creating a low duty cycle operation to preserve cell phone battery capacity. GeoZone functionality can be implemented by comparing current GPS position (established by phone's internal GPS receiver/processor 14) to stored geo-location zones selected to include toll point locations. A limitation on this approach is the maximum number of GeoZones in an iPhone is 20. Alternate methods include using BLE beacons 9 to indicate to the phone application 17 that it is in the vicinity of a toll collection point, or by using WiFi AP's 8 SSID's or MAC addresses that are detected by the phone using the phone's WiFi 15 radio.

Signal Strength of Smart Phone Signal for Lane Determination

The basic concept of identifying the travel lane relies on RSSI, provided by common WiFi and BLE transceivers used in mobile phones and fixed transceivers. RSSI-based algorithms for range and direction determination must be used with care owing to:

Multipath corruption, occurring when the radio wave from a transmitter bounces off obstacles in its path and arrives at the target with relatively small time offsets from the direct path, Antenna patterns with nulls in particular directions, and Sensitivity to polarization.

In any system architecture, it is clear that there are several feasible methods of data processing to determine the lane of travel. The implemented solution also depends on antenna type and location, and also on the disposition of the phone as a transmitter or receiver. In one approach with a phone transmitting and one antenna per lane, the roadside server 20 looks only at messages that meet a minimum threshold of signal strength received from the smart phone, then compares the signal strengths received from each antenna to determine the strongest one over a specified period on the order of 30 ms. As the smart phone traverses the roadway each period has a count assigned based on the strongest signal strength received on an antenna. The most proximate antenna or alternatively the lane of travel is determined to be the antenna or lane with the most counts in a larger second period (roughly 300 ms) or the total such counts during the entire period required to traverse the section of roadway.

Figure 3:
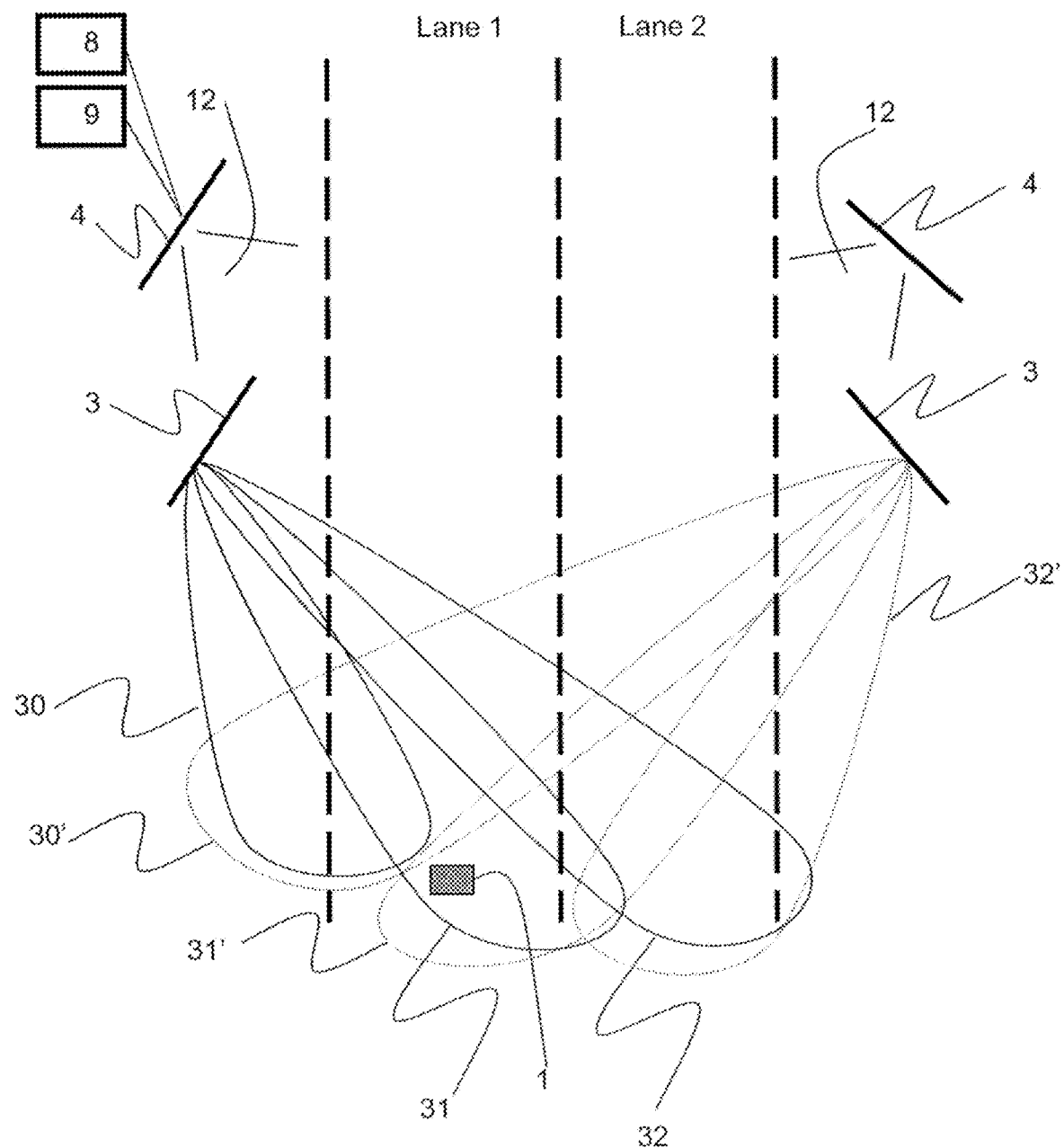
FIG. 3 is a diagram of an exemplary embodiment of the inventive system.
Figure 4:
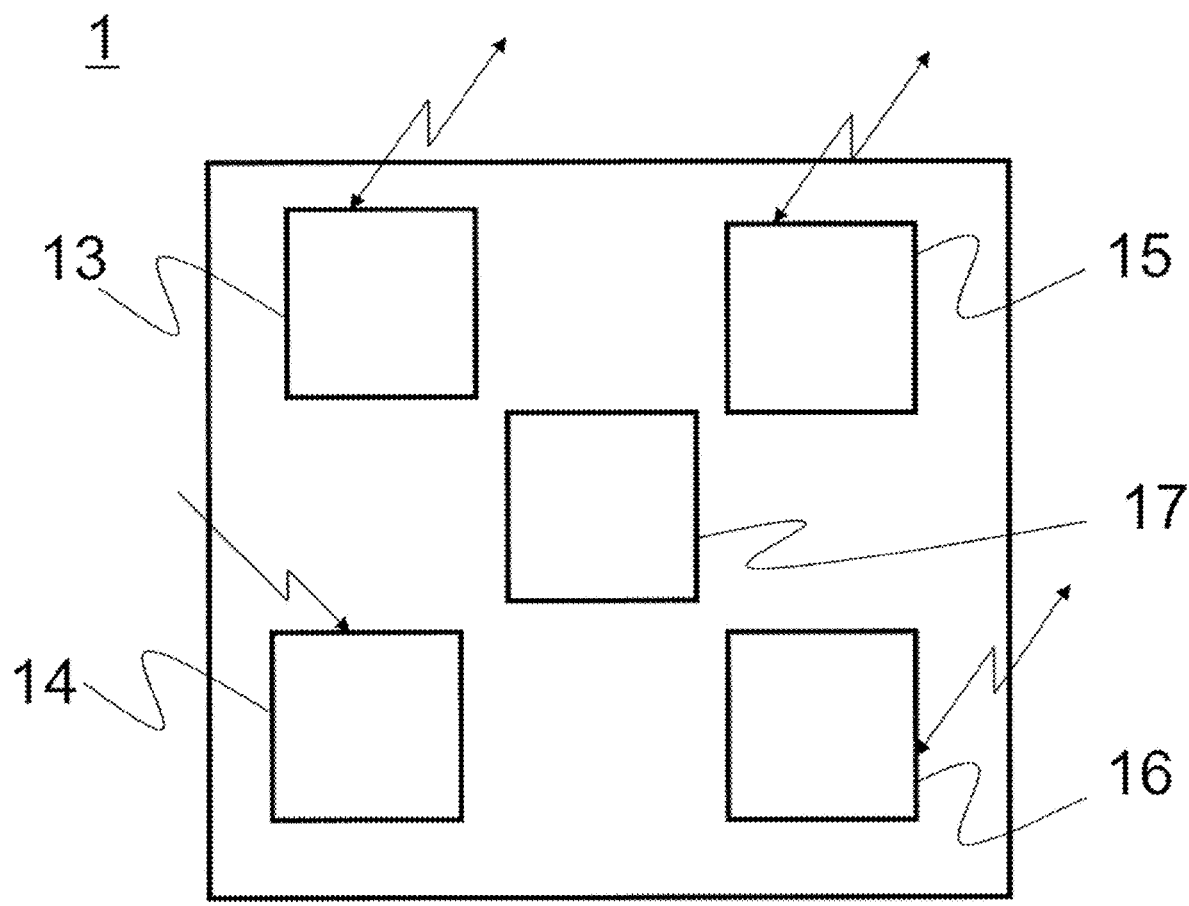
FIG. 4 is a diagram of an exemplary embodiment of the smart phone of the inventive system.

FIG. 3 shows an exemplary design using multi-beam antennas 3 fed by Butler matrices, creating highly directional beam patterns 30, 30', 31, 31', 32 and 32'. By determining the strongest signal path between each antenna and the phone, either received from the smart phone, it is possible to very accurately determine position of the phone and presumable the vehicle. In the example shown, the smart phone is positioned for best reception in beams 31 and 30', and it is a simple matter from there to determine that these beams intersect in Lane 1.

Phone as Receiver

In one variation of the system multiple BLE transmitters, or "beacons" 9, can be installed across the roadway on a gantry 5 and connected to high gain antennas 6. A high gain antenna for purposes of this specification is an antenna with a gain of 8 db or higher.

In an embodiment, the beacon ID and time stamp are included in its transmitted data to allow the mobile to identify its location at a time stamp. The beacon transmits at a high rate, approximately once per 20 milliseconds. The beacon time stamp is synchronized to local system time to resolve transactions. Specialized beacons with high gain can be used for tracking or localization.

An exemplary beacon is the iBeacon, which uses a protocol developed by Apple®. Various vendors have since made iBeacon-compatible hardware transmitters that advertise their ID to nearby portable electronic devices. The technology enables smart phones, tablets and other devices to perform actions when in close proximity to an iBeacon.

In an embodiment, the phone receives messages from multiple Beacons and stores relevant data fields such as beacon ID, plaza and lane number, latitude/longitude, time and date, and RSSI.

As battery life on mobile devices is a key product differentiator, some devices limit the transmit rate or the effective receive rate for wireless transceivers. For example, iPhones apply such limits to the BLE functionality, resulting in A maximum transmission rate that is less than the BLE standard maximum.

A diminished sample rate when the device is scanning for beacons; that is, the sample rate is less than the BLE transmission standard maximum, so samples cannot keep up with beacons transmitting at that rate.

These restrictions are relaxed, however, when the iPhone is detecting an iBeacon, so while it is in range of an iBeacon it is able to record BLE beacon data in background/sleep mode at nearly the same rate as the beacon advertising rate. This requires a system architecture that contains iBeacons to "awaken" iPhones® and beacons to provide advertisements for the toll transaction. The iBeacons must have a coverage zone that extends well upstream from the toll plaza to provide sufficient time for the phones to be ready to record beacon data when travelling through the plaza. A single antenna or multiple low gain antennas may be used to provide a wide area communications zone to accomplish successful reception of the iBeacon message. These are used in combination with high gain antennas used for the subsequent beacon messages which form a more constrained communication zone. The phone can transmit log data to a server for post processing and analysis, or preferentially analyze it to determine lane number and transmit that information to a server.

The simplest approach, when the phone is acting as a receiver and beacon transmitters are fixed across a roadway, is to transmit BLE undirected non-connectable advertisements. The format of the advertisement message is defined in the BLE standard, and includes 31 bytes of user-defined data that can include all relevant information for a toll transaction. The phones operate as BLE passive scanners and do not transmit. An individual phone would likely hear multiple beacons as it traverses a toll plaza, and would have to process the data to determine lane location or transfer the data to a back office for post-processing, including lane location.

Non-connectable, undirected BLE advertisements have a minimum time interval between advertisements of 100 msec. This time represents 14.7 feet for a vehicle traveling at 100 mph. Shorter time intervals are necessary for accurate signal strength histories, and are also useful for timing coordination with existing sub-systems in a toll plaza such as video camera systems. Connectable, directed BLE advertisements have a minimum time interval between advertisements of 20 msec, or 2.9 feet for a vehicle traveling at 100 mph. This provides much improved resolution while eliciting BLE scan requests from mobiles.

Further time resolution may be achieved by including multiple BLE modules in a beacon. For instance, two beacons can share an RF connection to an antenna, making the effective advertisement interval equal to 10 msec. The mobile application would have to correctly interpret advertisements from both beacons as coming from the same lane, a simple matter of software. Finally, a high duty cycle mode exists in BLE connectable directed advertisements, where the maximum advertising interval is 3.75 msec. This would provide a significant increase in resolution, perhaps more than necessary for a toll system. However, not all devices support this high duty cycle mode.

The data recorded on the phone would likely include, at a minimum, time stamp, beacon ID, and RSSI for each sample. The sample plot in FIG. 8 displays BLE RSSI recorded on a phone located in a vehicle traveling through a lane with a Beacon overhead in the travel lane and another Beacon overhead in an adjacent lane. The difference in peak signal strength between two Beacons is clear, and one Beacon is clearly stronger for the majority of the record.

This concept is not restricted to BLE, as the wireless protocol could be WiFi or any other that is available on a smart phone.

Signal Strength of Beacon Signal for Lane Determination

In an approach, multiple messages may be transmitted by a BLE transceiver, or "beacon", through a high gain antenna and received by the smart phone. The high gain antenna will be generally set up on an overhead gantry with maximum gain direction pointing towards the road surface or slightly up-tilted toward vehicles as they approach the toll point, forming a capture zone on the road where vehicles are in position to communicate with the beacons. While the capture zones for each beacon will overlap in a typical case of one antenna per standard-width lane, higher signal strengths tend to occur near the antenna boresight. Because the lane numbers are associated with beacons with known IDs, the location of the vehicle can be determined by analyzing RSSI data for the beacons captured on the phone. The phone application 17 may evaluate the number of messages received and the RSSI values from each beacon to determine the position of the phone relative to the beacons, hence the lane. The toll can then be collected from an account associated with the unique ID for the vehicle passing the toll point in that particular lane, wherein the lane/proximate antenna/beacon information is sent with the unique ID to the toll system and or account service center. One approach in this case is that the application on the phone compares the signal strengths received from each beacon antenna to determine the strongest one over a specified period, say 30 milliseconds. As the phone traverses the roadway, each period has a count assigned based on the strongest signal strength received on an antenna, the most proximate antenna or alternatively the lane of travel is determined to be the antenna or lane with the most counts in a larger second period (say 300 milliseconds) or the total such counts during the entire period required to traverse the section of roadway.

Another simple algorithm to make the lane determination is to examine the strongest N samples for all beacons and average them to create a single number for each lane. This may be thought of as a low-order estimate of the area under the curves, proportional to energy, and possessing increasing accuracy as N increases. As N increases, more calculations are required which increase the burden on the processor. Hence a proper value for N is a tradeoff between accuracy and processor burden. In practice, the number N can be arrived at through trial and error. In the case summarized in FIG. 8, the difference in the averages between the correct lane and adjacent lane is 13 dB, using N=10. The difference of 13 dB is also approximately equal to the peaks of the curves. Utilizing a single peak value would provide the correct answer in many cases, but RF multipath can corrupt a single sample more easily than several samples.

Figure 8:
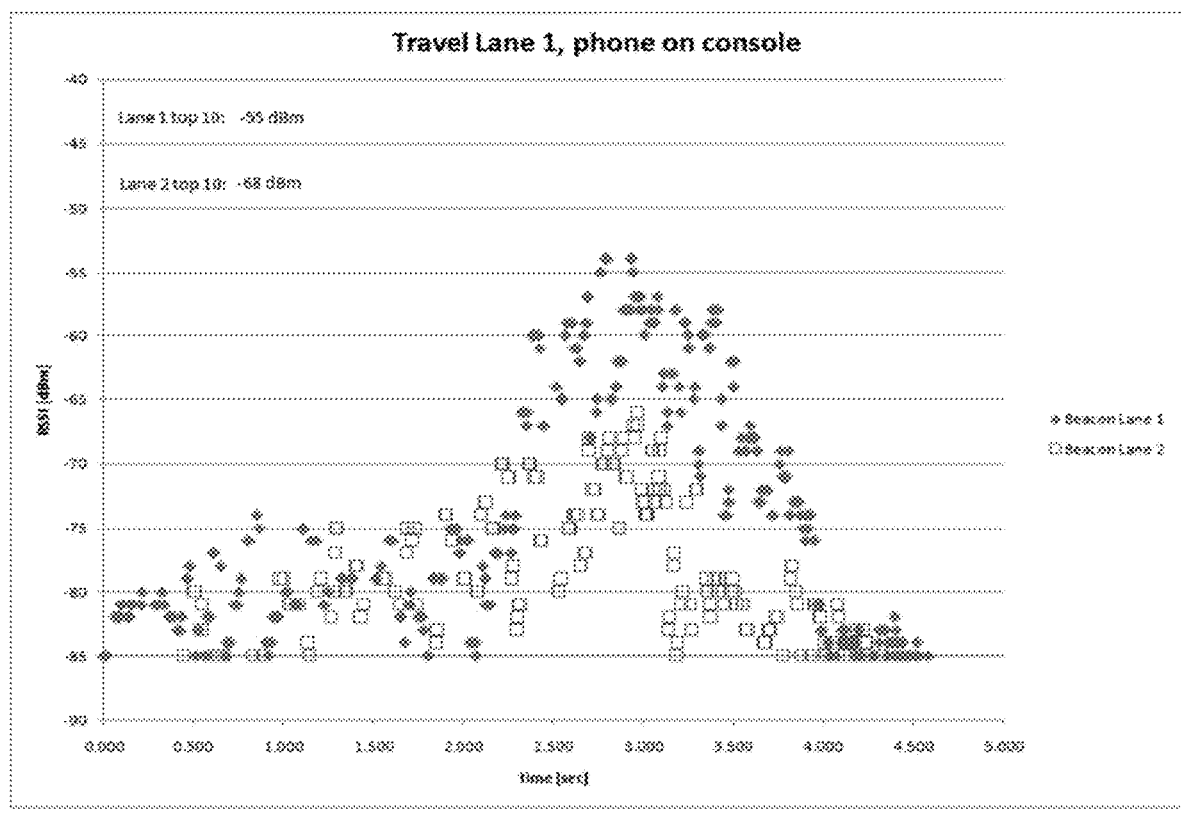
FIG. 8 is a graph of RSSI versus time for beacons in two locations.

To assign the best time stamp for correlating the vehicle passage to other lane sensors, a straightforward algorithm is to use the median of the time stamps for the five data points with highest RSSI in the assigned lane as can be performed for example on the plot in FIG. 8. This synchronized and accurate time stamp combined with accurate lane position allows the transaction to be accurately post-processed into the toll system transaction.

To use the system, users download an application with the foregoing capabilities to the smart phone. Upon download of the phone application, the user will use application-supported account management features to set up an account with the appropriate toll authority or third party service provider, create a link between the unique ID/address information to the account, and provide a means for the settlement of toll charges associated with the unique ID (such as a credit card).

Zone Definition with Geo-Fencing and iBeacons®

The overall goal is to be able to determine which lane a vehicle and phone are in based on messages received from multiple BLE beacons. In an embodiment, upon receiving beacon messages and leaving a Geo-fence area or iBeacon® zone, the raw beacon log data is transferred from smart phone to server for transaction analysis/processing. See FIG. 8 for diagram of beacons within a Geo-fence.

Smart Phone Stores Beacon Time Information and Reports Later

Alternatively, the smart phone application can simply save the Bluetooth® LE beacon messages as the smart phone passes under the high gain beacons on the toll facility. The messages will contain, at a minimum, data identifying the location of the toll lane and the time the beacon message was sent. The smart phone will normally receive multiple messages from multiple beacons while traversing the toll plaza. A clock in the beacon establishes the time in the message and is synchronized to the other toll equipment to a sufficient resolution (say 1-100 ms) to allow the transaction to be correlated based on the time of the transaction with other elements of the toll system such as a vehicle detection system or a video-based license plate reading system. This saved data is then sent as soon as practical via any of the smart phone's data connections (Bluetooth®, WiFi, WAN data) to a server where the processing to determine the lane position described above is executed. In this case the server need not be located roadside but can be located anywhere.

In one embodiment a Geo-fence function is used to determine when the buffered BLE beacon messages or processed results should be sent to the server over an available data connection. Geo-fence applications are well known in the art and provide a function to allow a specific area to be defined such that an alert is generated when the Geo-zone area is entered or exited. A Geo-zone can be created around the toll plaza or area. When the area is exited an alert triggers the sending of the processed or unprocessed beacon data to the server for post processing into the toll transaction. Similarly a Geo-zone can be established downstream of the toll point where traffic must traverse, and entry into this Geo-zone can also trigger the sending of buffered data to the server for processing.

It may not be possible given the state of smart phone technology or limitations in smart phone systems to send beacon data in real time to the server. However, because the beacon data contains a time stamp synchronized to the toll system at the toll plaza, a toll transaction can be generated and post-processed with other data collected from other toll sensors proximate to the roadway to form a complete toll transaction. For example, most toll systems include a video-based enforcement/toll system at the toll plaza. Such systems use various techniques well known in the art to take a photo of the vehicle license plate which can later be processed and "read" automatically by a computer. In prior art systems, the toll payment is made by an RFID reader reading an RFID tag associated with a user account that settled to the user's credit card or bank account. If this toll payment is made, the photo taken of the license plate is associated with the vehicle need not be processed and can be discarded or stored according to policy. If a payment is not made, either a violation against the vehicle owner of record or a video-based toll against an account or the vehicle owner of record is processed.

One advantage of post processing the transaction data is that substantially all of the data points collected on the transaction between the beacon and the smart phone can be collected and used to determine the lane position and to determine a time stamp for the transaction that best represents when the vehicle passed under the antenna. More data typically means better quality output result for almost any reasonable algorithm used to determine vehicle position relative to the beacon antennas.

Typically a trigger system is used, employing one of many vehicle detection technologies known in the art, to determine the vehicle's location on the roadway to take the photo of the license plate. In order to allow toll payment by smart phone rather than RFID tag, the phone application requires the user to establish an account with the toll authority, or through a private third party account consolidator who sets up a consolidated account for the user with multiple toll agencies. At that time an account identifier is established by the application or by an account server in communication with the application over an internet connection supported by the smart phone. That account identifier is sent by the smart phone when the processed or unprocessed beacon data is sent to the server, typically after a Geo-fence or iBeacon zone exit event occurs to trigger the sending of this data. The trigger point for the license plate photograph is aligned to the direction of maximum gain of the antenna, allowing the determined travel lane to be associated with an accurate time stamp. As this time stamp is also synchronized with the video system, the beacon transaction can be compared to the video transaction to ensure they are from the same vehicle, eliminating the need for the license plate photo to be processed.

Typically, this transaction from the smart phone will not occur in real time. This is because the sending of the data will be triggered by an event such as a GeoZone exit (or entry) event, iBeacon read zone exit, or RSSI residing below a threshold for an elapsed time, all of which occur after the vehicle has passed through the toll plaza. Additional sources of latency in the communications network will add to this. All of the data collected as the vehicle traverses the plaza is available for the algorithm that determines lane and time of passage. It also implies that the photo data and any other associated sensor data pertaining to the toll transaction must be stored for some period of time to allow receipt and processing of the data from the smart phone to create the toll transaction, so that it may be post processed against this stored data as described above. The minimum period of storage, and the resulting storage capacity are determined based on the maximum expected delay in sending and processing the smart phone data so that it may be post processed. Alternatively, all such data may be permanently stored according to policy.

In Apple's® iOS operating system applications that are not actively being used by the user operate in the background. Usually these applications cannot process data or access resources to preserve battery life. In the contemplated system it is highly advantageous to avoid the need for user action, as a matter of customer convenience and driving safety. There are some exceptions in iOS that will allow some processing time to be allocated to an application running in the background. One exception involves the use of geographical areas. Upon entering a geographical area, the phone application can be automatically launched or elevated in priority by the operating system. Upon receipt of BLE data expected by or intended for the phone application, iOS will provide a specific allotment of time for the application to process the BLE data. In one embodiment all of the stored BLE messages received are uploaded to the server over the WAN data link using a web services call.

Another approach to resource conservation while the toll application sits in the background is to create iBeacon zones in the roadways that have beacon zones within them. The iPhone will not log iBeacon advertisements at a rate faster than one per second, regardless of the iBeacon advertisement rate. It will record beacon advertisements much faster in general, and approximately at the same rate as the advertisement itself, if the iPhone® is in range of an iBeacon.

Data Transfer

In a further embodiment, transaction data is stored in a file on the phone. Data can be received and logged even with the phone in sleep mode. Data is downloaded to a server with no user intervention, triggered by an event such as a Geo-fence trigger described above. Because data will not be downloaded in real time, transactions must be post-processed into the toll transaction to be correlated with data taken at the toll area, such as video or camera recording of license plate, and vehicle detection.

Approach Using Conventional Transponder as Repeater

In one alternative, a transponder device is installed in the conventional electronic toll lane in a similar fashion to how test transponders are used today. The transponder acts as a repeater of the information transmitted by the smart phone. The transponder contains a BLE or WiFi transceiver which receives transaction information from the phone to include the phone unique ID. When interrogated by a reader, the transponder will mimic the type of message sent in conventional electronic toll messages with an account ID associated with the phone unique ID. In this way the system described above can be implemented with minimal or no changes in the software and integration of the toll system or conventional back office/service center.

Streamlined Transaction

In another embodiment, BLE beacons broadcast advertisements via antennas 6 that are typically dispersed one per lane, although two per lane may be used, or fewer than one per lane may be used. When received in an application resident on the smart phone 17 these advertisements trigger response messages sent by either the BLE radio 9 or WiFi 8 radio in the smart phone with a data response similar to how prior art active RFID transponders behave today. Simultaneously, these BLE Beacon messages could trigger return messages to the toll system over any combination of WiFi, BLE or common carrier WAN data connection present on almost all smart phones. These responses contain information that is sent to a service center for the settling of toll collection related to the vehicles' use of the roadway. This information is transmitted to the service center either by a toll system network of the type commonly used today (in the case of WiFi or BLE return message) or via the WAN connection 10 directly from the smart phone to the service center, or any combination thereof which provides for redundancy of messaging and therefore enhanced reliability. In all cases the return message with unique identifier is received at the service center where account settlement is performed, and the toll is settled to the account associated with it. In a further embodiment, a smart phone is a receiver initially scanning passively for BLE advertisements from the beacons as it enters a capture zone. Upon decoding an advertisement, the phone optionally sends a BLE Scan Request (SCAN_REQ PDU) to the beacon. The request payload consists of the beacon address and the phone MAC address. The beacon issues a BLE Scan Response (SCAN_RSP PDU) in response to each received SCAN_REQ. The total number of scan responses represents the number of transactions with a phone.

The timestamp for the transaction resides in the scan request payload and must match the timestamp for other toll systems (i.e. video cameras), within an allowable tolerance.

At the completion of the transaction, the system composes an encrypted data packet containing the phone MAC address, time and date, plaza and lane ID. This is sent to a back office via typical means, for example either over land line communications such as an internet connection or wirelessly such as by a cellular data connection, and checked against video data for violations.

RF Considerations

In an implementation utilizing single-beam antennas, each lane will typically contain an overhead antenna 6 with high gain, circular polarization, and sufficient bandwidth to cover the entire ISM band around 2.45 GHz. The antenna points approximately downward, reducing potential for cross lane communication. By contrast, antenna pointing angles near horizontal can allow large vehicles to block the direct RF path of smaller vehicles in the same lane, and multiple phones in different lanes to be transacted with at relatively longer distances where the beams have spread significantly. Pointing downward, therefore, allows easier control of the capture zone.

A high gain antenna with low side lobes and a sharp beam roll off will minimize RF leakage into the adjacent lanes. This pattern must be consistent across the entire ISM band because BLE uses RF frequencies spanning the band.

Finally, circular polarization is preferred in the Beacon antenna because of the variable antenna pattern in the phone. Linear vertical or horizontal polarization could be used, but circular polarization is preferred so as to make the communication link to the phone less sensitive to the orientation of the phone in the vehicle. This allows the user more flexibility for the phone's location inside the vehicle, including the seat, in pocket, on the vehicle's dash board, or in its center console, creating good RF link performance unaffected by orientation of the phone. Most antennas targeting 2.45 GHz devices in mobile phones have nulls in each plane. The location and depth of the nulls is dependent on frequency and polarization, and a circularly polarized Beacon antenna will provide polarization diversity.

Frequency diversity is a de-facto feature of the system when using wireless protocols that utilize a sufficiently large RF frequency band. A large operating frequency band causes phone antenna nulls and RF fades to move as frequency changes. In a BLE system, for example, advertising channels hop between 2402, 2426, and 2480 MHz. The antenna operating band must be at least this large to take advantage of this.

The required antenna features of the system described above enhance chances of the in-lane beacon transacting with the phone, as opposed to the adjacent-lane beacon. It does not entirely rule out cross lane transactions, so an appropriate system will monitor the number of transactions on all beacons for a specific phone and choose the travel lane appropriately.

Multi-Beam Antenna

With smart phones acting as transmitters, the receiving antennas located in the toll plaza may take multiple forms. One embodiment is a pair of multi-beam antennas straddling the roadside to enable angle-of-arrival-based lane determination. A common form for the multi-beam antennas are planar arrays with Butler matrix feed systems.

Butler matrix antenna configurations are known in the art but can be uniquely applied in this case with either the WiFi or the Bluetooth® LE radio signals to track vehicles in which the phones are present and associated. Other forms of directed antenna configurations are also known, see for example U.S. Pat. No. 5,592,181, which is incorporated by reference herein. For example, see the thesis paper: Implementation of a 8×8 Butler Matrix in Microstrip by Henrik Nord incorporated in Appendix A of the provisional Application Ser. 62/214,638 filed Sep. 4, 2015 and the slide presentation Design and Implementation of Butler Matrix—Simultaneous Beam Formation, by Harish Rajagopalan, incorporated as Appendix B in the provisional Application Ser. 62/214,638 filed Sep. 4, 2015. Both of these documents are incorporated by reference herein. The multi-beam antennas can be used on their own for both communications and tracking, but may also be used with a set of low gain antennas where the low gain antennas cover the entire area of interest to allow more time for reliable communications roadway and the multi-beam antennas used for tracking only or primarily for tracking.

Figure 5:
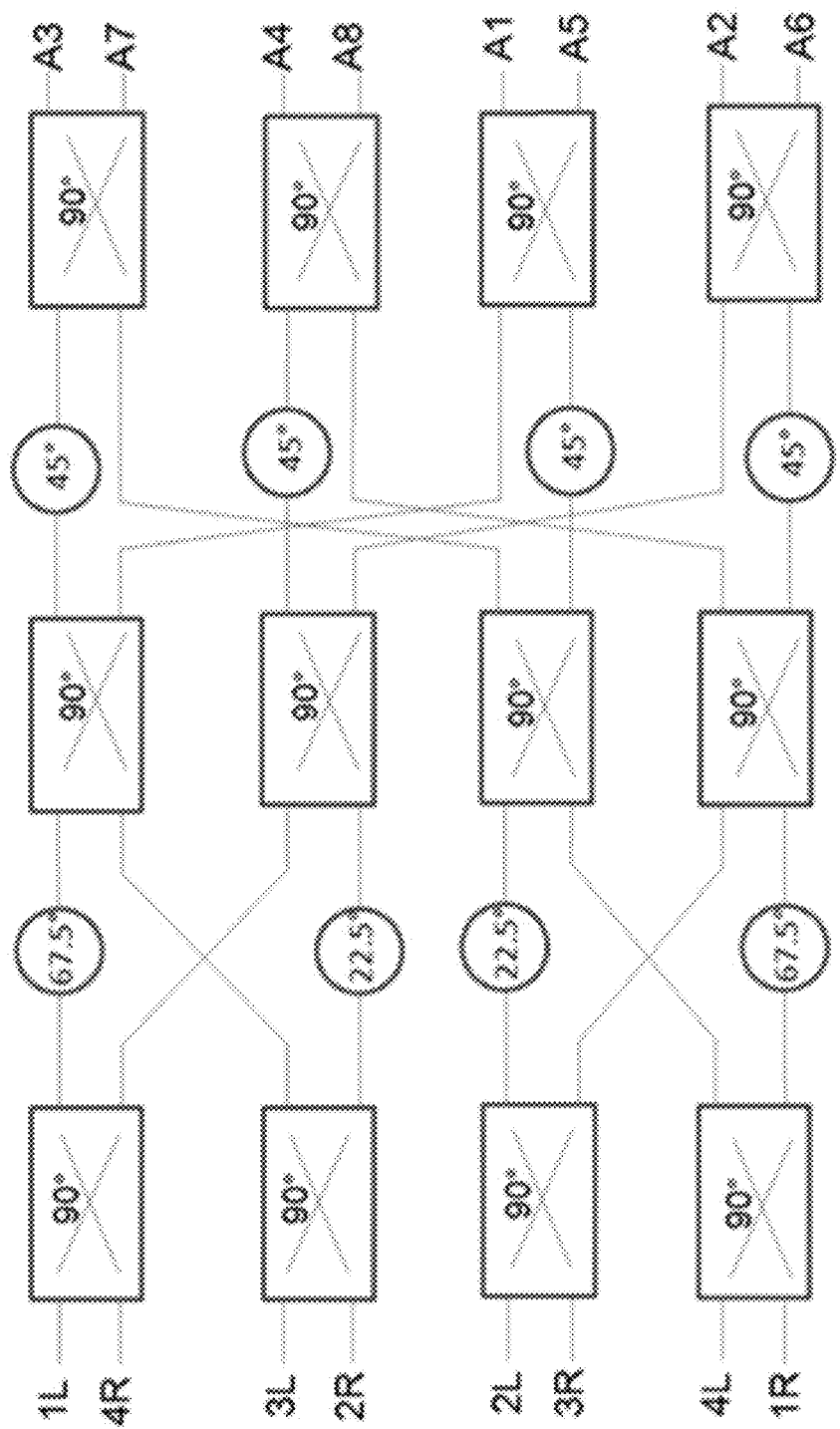
FIG. 5 is a diagram of an exemplary Prior Art 8×8 Butler Matrix antenna array.

The Butler matrix is a well-known beam-former, producing N beams from N groups of radiators. FIG. 5 is a diagram of an 8×8 Butler matrix. It can be thought of as a hardware realization of a Fourier transform, and indeed the diagram is reminiscent of an FFT.

Figure 6:
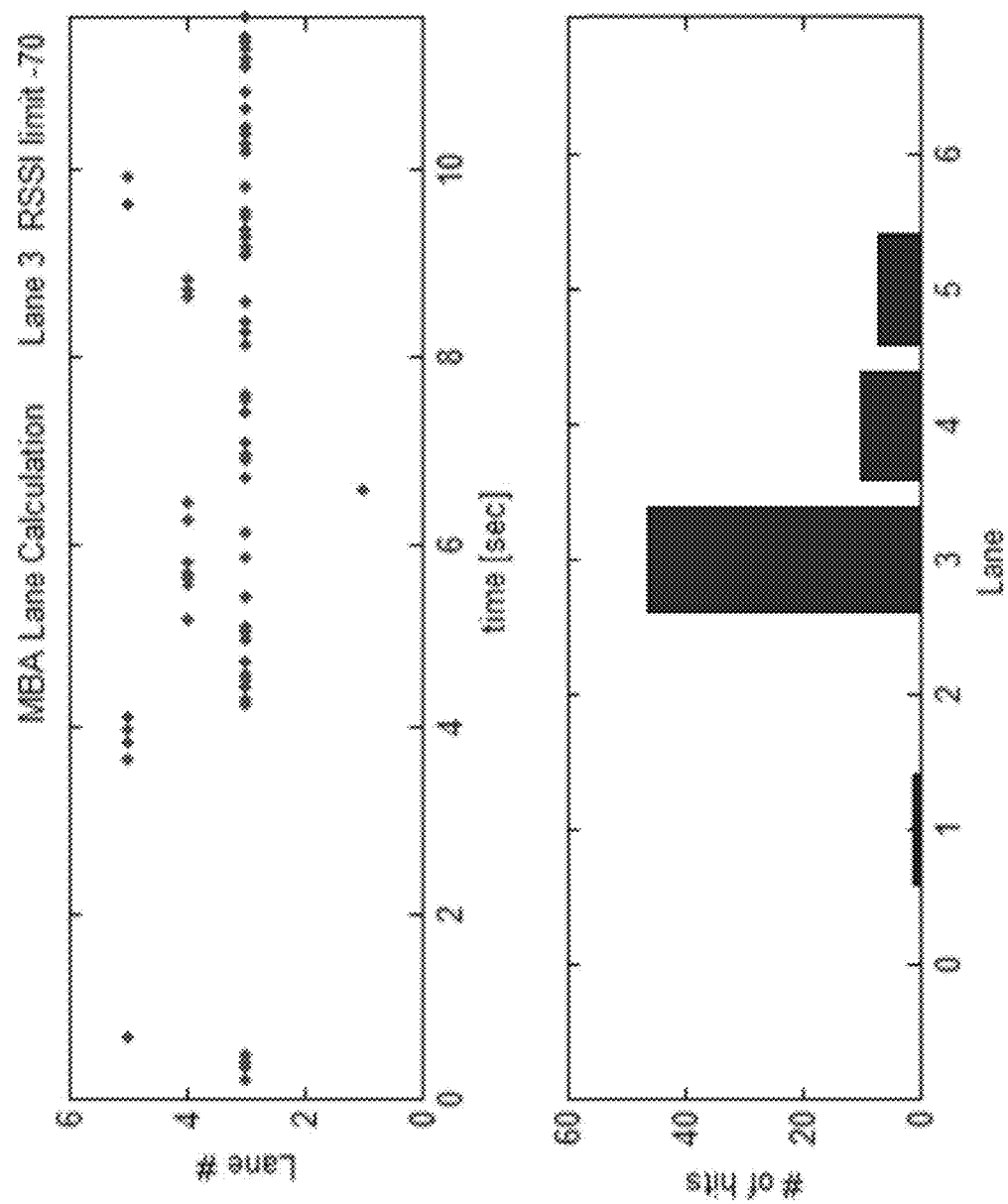
FIG. 6 is test results of a test-setup using two Butler Matrix antenna arrays.
Figure 7:
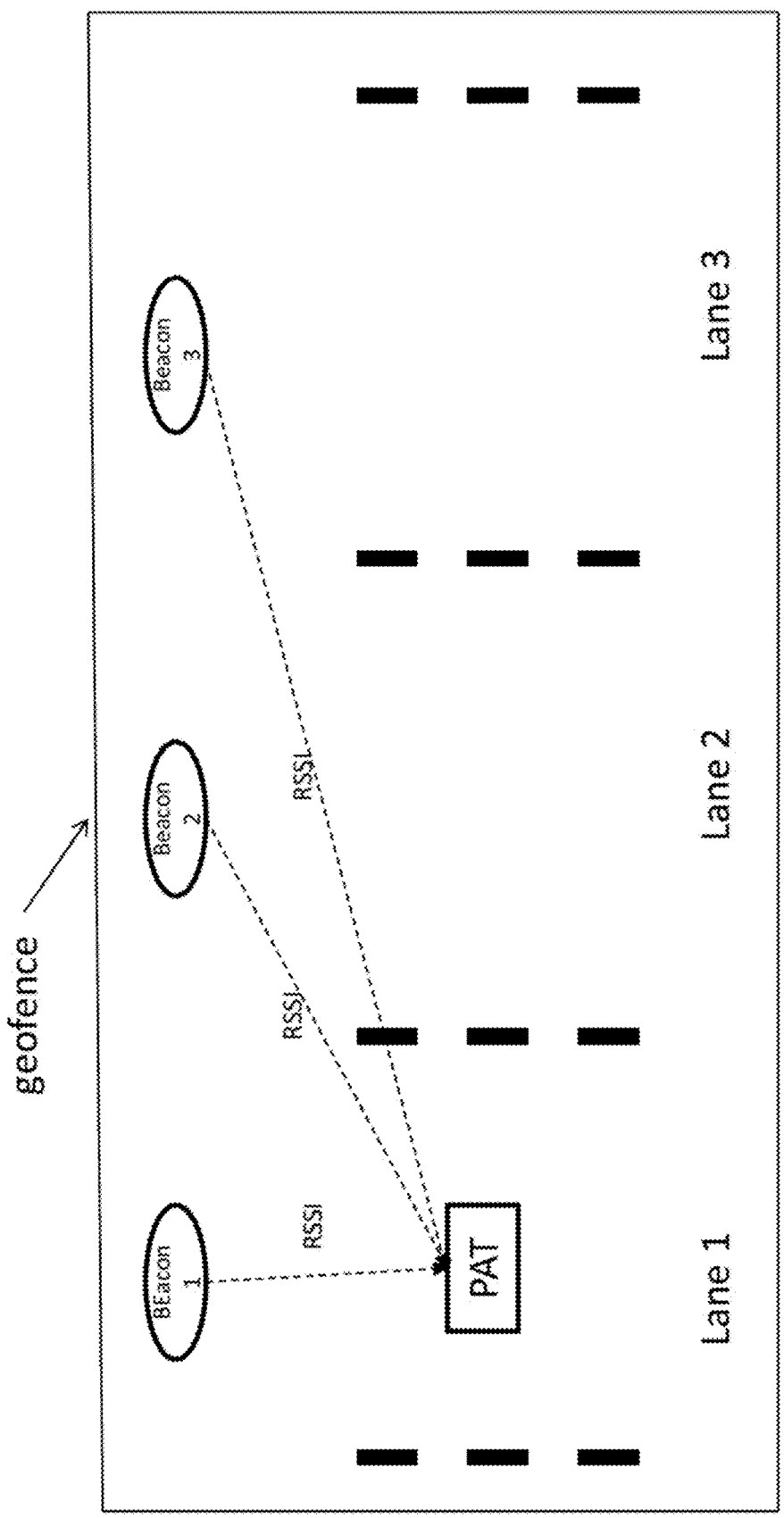
FIG. 7 is a diagram of an exemplary three-lane system bounded by a Geo-fence.

FIG. 6 shows the results of experimental evaluation conducted with two multi-beam antennas installed roadside. The test results showed significant ability to locate the vehicle position across 6 lanes. The graph shows post-processed data: the computed lane number as a function of time, and the total number of hits for each lane. Multipath is evident in hits for lanes beside lane 3 (the actual travel lane). One car at a time was tested.

These experiments were conducted with a 2.45 GHz radio in the vehicle under the dash on the left side of the vehicle, which is a non-ideal position for the transmitter in the vehicle because the signal must reach the receiver via multi-path. Similar, but less severe multi-path can be expected based on the typical locations users will have their phone in the vehicle, be it in the user's pocket, belt, purse, cup holder or passenger seat. All of these locations will potentially see multi-path between the smart phone and exterior antennas, but probably less severe than the conditions of the experiment. Notwithstanding the more severe multi path conditions for the experiment, reasonably good position results were obtained in determining the lane of travel by assigning the transmitter to a lane position by summing the number of points where the peak beam signal strength of the Butler matrix antennas indicated an intersection point in a particular lane and assigning the lane position to the lane with the greatest number of such points as the vehicle traverses a section of roadway.

To use the system, users download an application to the smart phone. Upon download of the phone application, the user will use application supported account management features to set up an account with the appropriate toll authority or third party service provider, create a link between the unique ID/address information to the account, provide a means for the settlement of toll charges associated with the unique ID (such as a credit card)

The test results (FIG. 6) showed significant ability to locate the vehicle position across 6 lanes. The graph shows post-processed data: the computed lane number as a function of time, and the total number of hits for each lane. Multipath is evident in hits for lanes beside lane 3 (the actual travel lane). One car at a time was tested.

Mileage Reporting System for Mileage Based User Fees

In another embodiment, the smart phone application is configured to support the accurate and secure self-reporting of miles driven by taxpayers in jurisdictions where taxes are collected based on the number of miles driven in the jurisdiction. As a possible way to meet policy objectives, California and Oregon have pilot projects and consideration is being given to similar taxation system by the U.S. Federal Government. However a practical, private, easy, accurate and secure way for user to report the mileage and corresponding tax has been lacking.

The basic reporting approach of the invention involves installing BLE beacons at locations convenient to the motorist such as gas stations, oil change facilities, smog check stations and car washes, called reporting facilities. In the preferred embodiment drivers self-report the mileage and pay the tax periodically, perhaps once per quarter or per year. The phone application of the invention makes it easy and secure to report mileage.

The design of the phone application is such that the user enters a reporting facility and parks in a designated location designed to be covered by the BLE beacon. The beacon data includes location data and a secure identifier. In one embodiment the secure identifier is an encrypted combination of the time and location information. The locations are selected and high gain antennas placed such that no more than one vehicle can be parked in a designated location simultaneously.

The phone application recognizes the beacon, processes the data, and starts the procedure. The user is prompted to take a photo of the vehicle odometer reading, and the application records the fact that the photo was taken proximate to the secure beacon and a specific date and time. Next the user is prompted to take a picture of the VIN or license plate number, and the application records that the VIN is also proximate to the same secure beacon at the same date/time (within a tolerance). This ensures that in fact the odometer photo and the VIN or license plate number photo are from the same vehicle.

The phone application applies OCR techniques to the odometer reading to create a data element and compares this reading to the previous reading. The application calculates the tax based on the difference in mileage from the previous reading.

Once the tax owed is calculated the phone application then prompts the user to make payment by electronic check, ACH, or credit card, Pay Pal® or other known payment systems. These payment methods can be newly established at the time of payment or stored at the user's preference. The user makes payment and an official receipt is sent to the users stored e-mail address.

If a user wishes to account for miles driven on non-taxable roads that might be exempt from the tax, such as out of state or private roads, a BLE beacon can similarly be placed at the access point to those facilities. For example, BLE beacons can be installed at the state borders to account for out of state miles. The phone application detects these border beacons to validate that the vehicle has indeed crossed the state line. Alternatively two beacons in sequence could be used to validate the direction of travel at the state line. The secure border beacon location data is stored in the application. The phone application then sets up a large position change feature on the phone, so that the phone application is activated by the phone upon a significant change in position, or after a certain period of time has elapsed. Upon activation, the application evaluates the data from at least one GPS fix to determine the estimated miles driven from the border beacon location. Upon each subsequent activation of the application on the phone a new GPS fix is taken and an incremental number of miles driven out of state. This process continues until the phone crosses another border beacon system indicating re-entry into the state (or alternatively, a GPS position fix within the state). The total accumulated miles out of driven out of state can be determined.

In addition, if policy dictates the need to collect mileage based tax or fee at different rates on different types of roadways this can be accommodated by the system design. For example, if a different rate is to be charged for controlled access highways than arterials, beacons can be placed on the controlled access points to identify entry and exit points which allow the determination of total miles driven on controlled access highways. Those miles can be accumulated in a separate buffer such that at the time of tax payment calculation the tax due can be determined based upon the differentiated miles driven. Similarly, when miles are driven on a toll facility which might typically be exempt from a mileage charge, BLE beacons on the toll facility can be segregated to calculate the correct adjustment to the tax owed at time of payment. Of course as described in this disclosure the BLE beacons can work with the phone application to be the primary method of toll collection, providing a seamless approach for the user to pay for services rendered.

In further aspects, vehicles carry both Bluetooth® devices and conventional radio frequency identification (RFID) electronic toll transponders. One problem that exists in this configuration is associating the correct Bluetooth® device with the corresponding RFID toll transponder in the same vehicle. The Bluetooth® device may be, for example, a smartphone.

Figure 9:
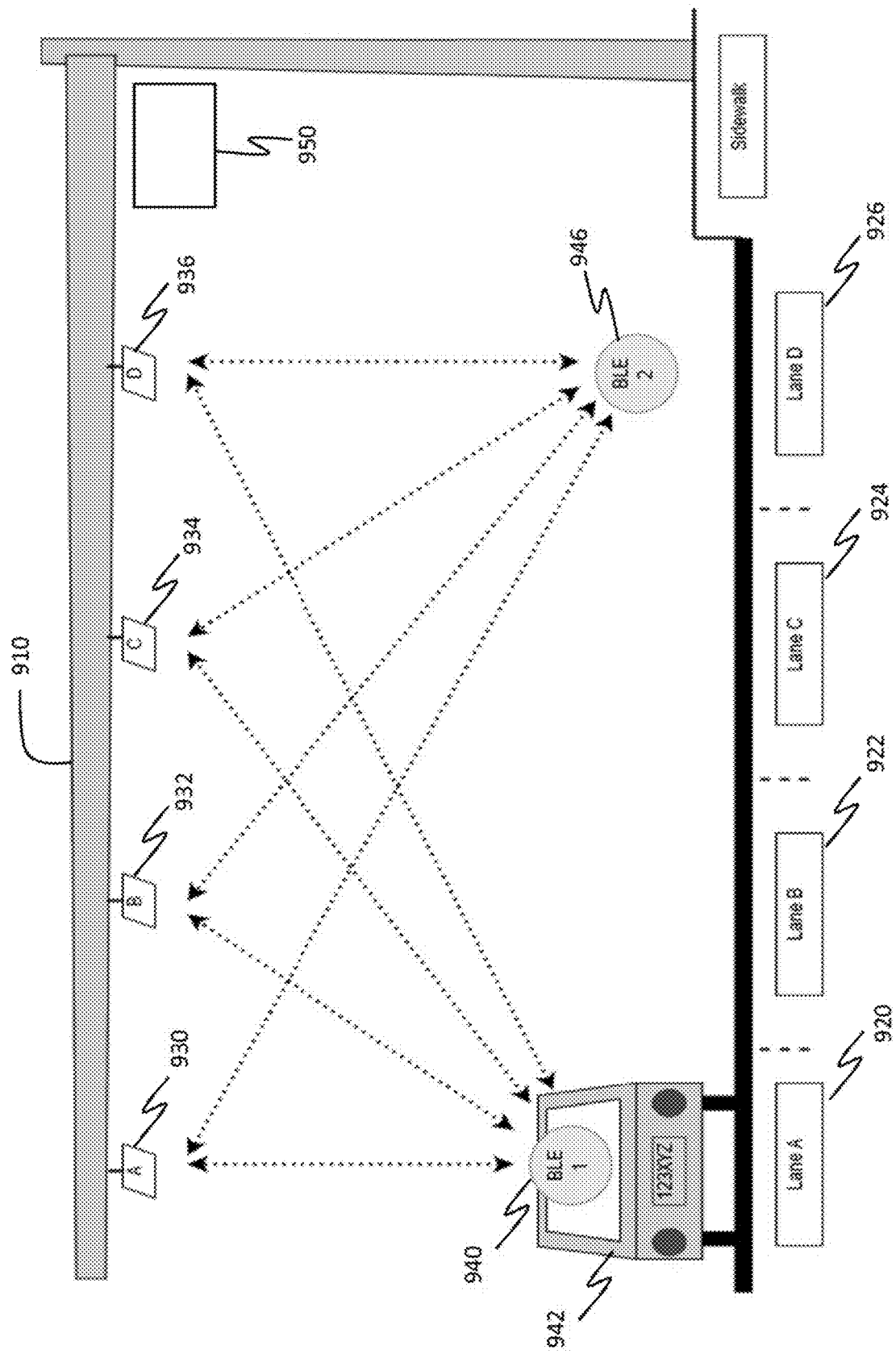
FIG. 9 is a diagram of an exemplary antenna layout with signal patterns superimposed.

Monitoring of the Bluetooth® device may be performed with Bluetooth® antennas mounted into RFID antenna housing which would be mounted "overhead" or "side-fire"

as dictated by the existing infrastructure. FIG. 9 shows an overhead gantry 910 spanning four lanes 920, 922, 924, 926, with an RFID reader antenna 930, 932, 934, 936 over each lane. In this system, the RFID antenna also contains an antenna for Bluetooth® devices. The reader antennas and the Bluetooth® antennas are connected to corresponding interrogators, which in turn are connected to a controller 950. With the Bluetooth® antennas mounted in this way, there is no impact on the aesthetic perception of the existing RFID interrogation antenna system with which drivers and highway administrators are familiar.

When a conventional RFID transponder in vehicle 942 in Lane A 920 is read by RFID reader A 930, this reading triggers the Bluetooth® receivers in all four RFID readers 930, 932, 934, 936 to read any Bluetooth® devices in the vicinity and their corresponding signal strengths. While hundreds of Bluetooth® devices might be sensed by the receivers 930-936, given the range of Bluetooth® signals (10 to 100 meters depending on class of device), a first round of filtering is performed by controller 950 that excludes all devices that were not read by all four Bluetooth® receivers. This filtering effectively excludes Bluetooth® devices that are far away from the read zone (lanes A, B, C and D), such as possibly in buildings or on the other side of the road, and that are only close enough to the roadway for the closest Bluetooth® receiver to be in range. Any Bluetooth® devices (e.g. 940) in a vehicle e.g. 942 and within the read zone (lanes 920, 922, 924 and 926) are expected to be within range of all four Bluetooth® receivers 930-936.

After the Bluetooth® devices that are not detected by all four antennas 930, 932, 934, 936 are filtered out, a second round of filtering may be performed. For example, a second round of filtering that uses triangulation to determine estimated location of the Bluetooth® signal source may be performed by, for example, controller 950.

FIG. 9 shows a vehicle 942 in Lane A 920, which triggered a Bluetooth® snapshot or reading to be taken by all four receivers 930, 932, 934, 936. However, there is also a Bluetooth® device 946 in Lane D that was captured or read in the snapshot (i.e. both the lane A Bluetooth® device 940 and the Lane D Bluetooth® device 946 were received by all four receivers 930, 932, 934 and 936).

Each of the four Bluetooth® receivers 930-936 will have measured a different signal strength for the two Bluetooth® devices 940, 946. In the case of the device 940 in the vehicle 942 in Lane A 920, the strongest signal will be the signal received at the receiver 930 in Lane A. Each of the three other receivers 932, 934, 936 will have measured weaker signals from Bluetooth® device 940 in lane A based on their increased distance from device 940. The signal measurements of all four receivers 930-936 may be used to verify the location of the Bluetooth® device. That is, in one implementation, the determination is not based solely on the single strongest signal, but the pattern of signal strengths from the receivers 930-936 across however many lanes (or antennas, in the case of more antennas than lanes) are present. For example, a Bluetooth device, such as device 940 may be confirmed to be in Lane 920 if the signal strength $(S_A)$ for device 940 read by reader 930>$S_B$ read by reader 932>$S_C$ read by reader 934>$S_D$ read by reader 936.

Once an initial determination is made as to the particular lane 920-926 for the Bluetooth® signal, a tolling system may further attempt to confirm that the received Bluetooth® signal came from the same vehicle that triggered the Bluetooth® read by presence of an RFID toll tag in Lane A. This may be done by checking whether the owner of the RFID tag in vehicle 942 has registered a Bluetooth® device with the tolling agency, thus associating the RFID tag, the vehicle and the Bluetooth® device. When Bluetooth® device data is coupled to RFID tag data, then the user ID of the Bluetooth® device is guaranteed to be associated with the RFID tag. Further associations with the RFID tag may be made by building a history of Bluetooth® devices that are observed whenever the RFID tag is present. Bluetooth® devices may also be associated with a registered first Bluetooth® device outside of the tolling environment by placement of one or more Bluetooth® readers that can build a history of Bluetooth® devices read at the same location.

In order to build additional associations with other devices in vehicles, a single Bluetooth® receiver can be set up. Whenever a known Bluetooth® device is sensed, a snapshot or reading of all Bluetooth® devices in that area can be taken, and over time, a history can be built of other Bluetooth® devices that are commonly seen with the known Bluetooth® device.

Figure 10:
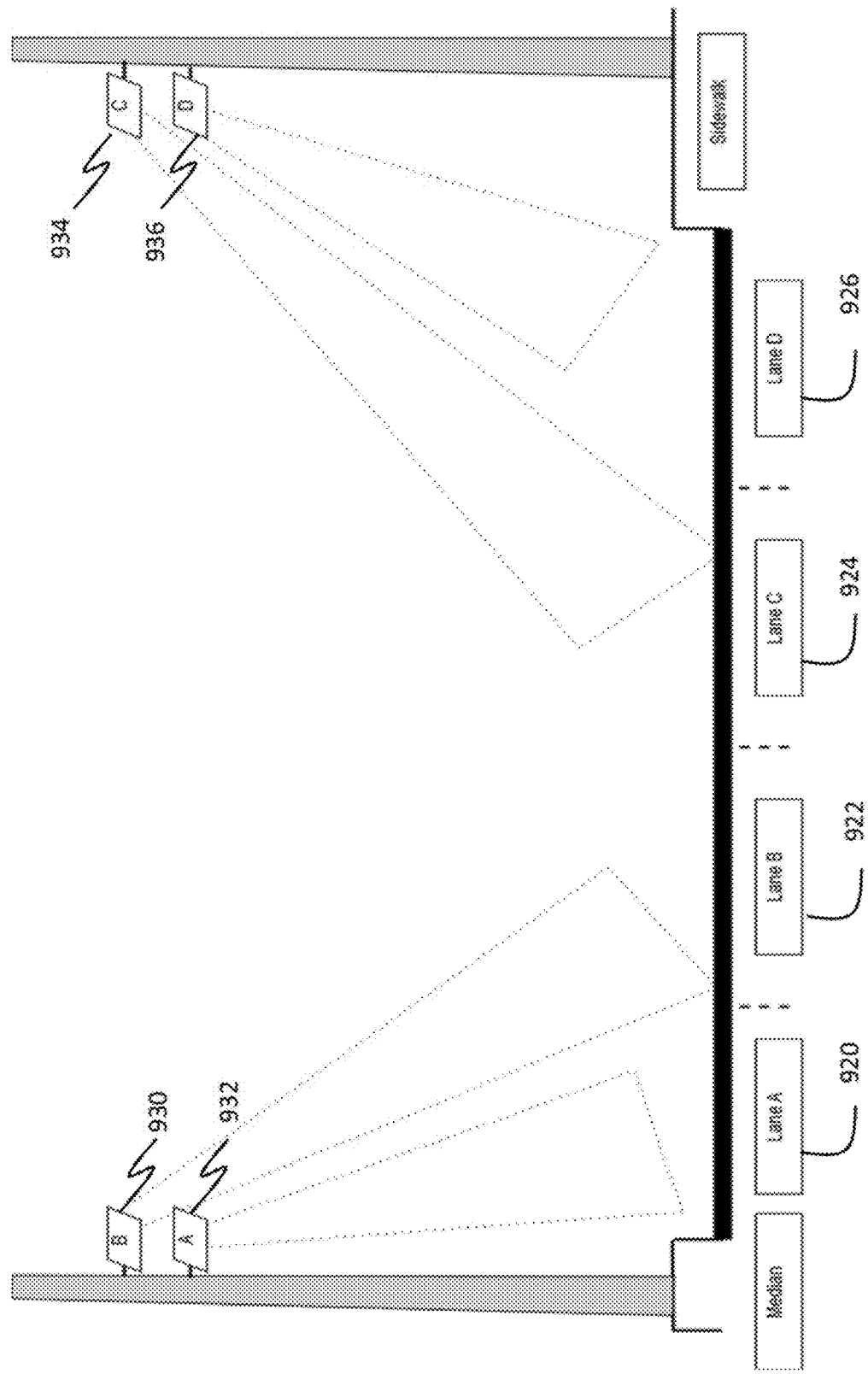
FIG. 10 is a diagram of a further exemplary antenna layout with signal patterns superimposed.

FIG. 10 shows a "side-fire" setup of antennas 930, 932, 934, 936. This setup may be used in situations where mounting of overhead equipment as shown in FIG. 9 is not practical or is restricted. The system shown in FIG. 10 could operate with one or more Bluetooth® antennas, with accuracy increasing with the number of antennas. Filtering may be performed using the same principles as described above as for overhead antennas. Results with side fire loaded antennas may be lower quality in terms of location and correlation, but still may produce useable data.

Figure 11:
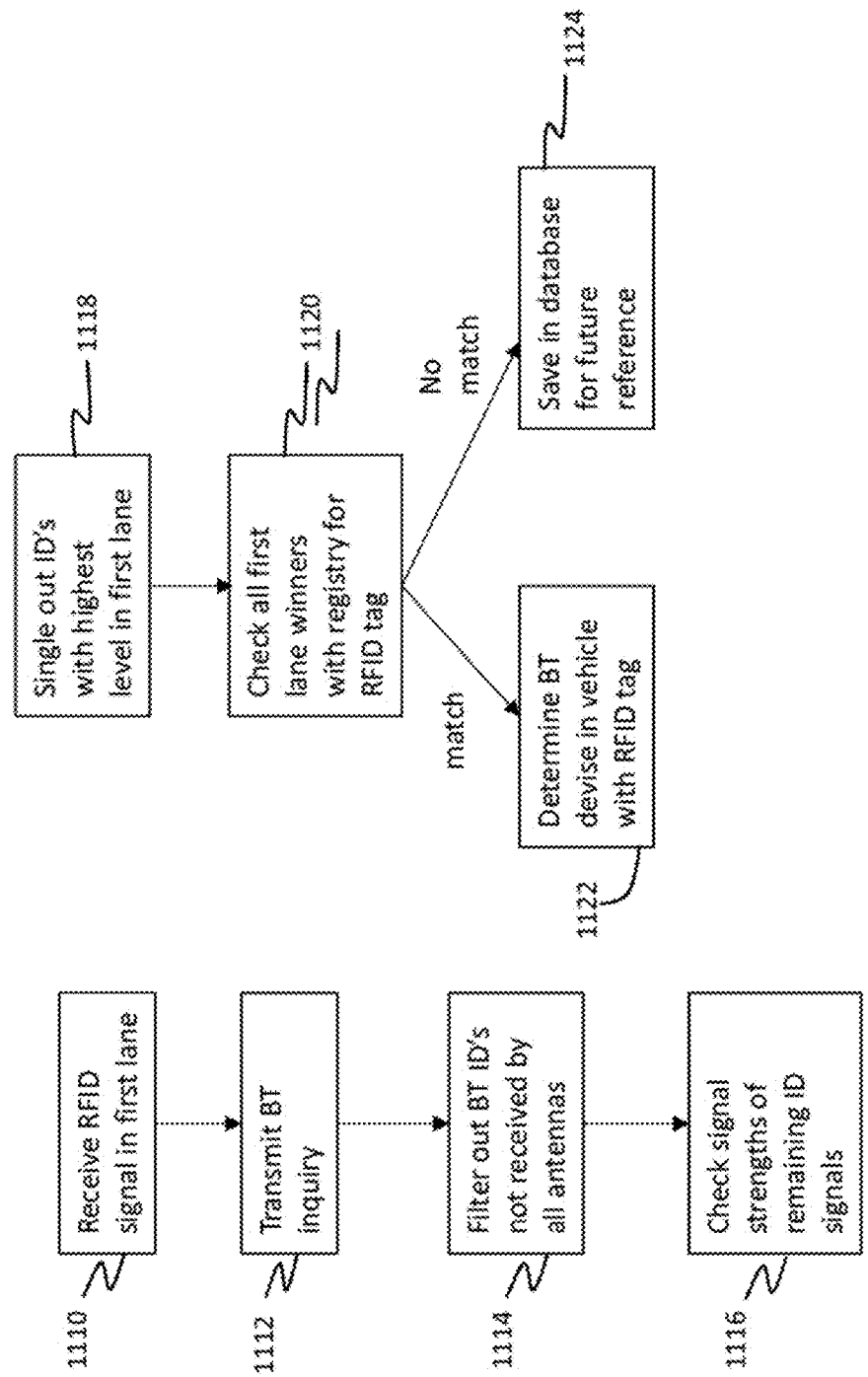
FIG. 11 is a flow diagram for processing Bluetooth signals received at a monitoring location also monitoring RFID toll transponders.

FIG. 11 is an exemplary process for associating a received Bluetooth signal with an RFID transponder in a vehicle. At block 1110, an RFID transponder is detected in via an RFID antenna in a first traffic lane. The RFID transponder may be a backscatter transponder, or an active transmission transponder. The RFID transponder may also be a multiprotocol transponder and may respond to whichever the preferred signal type for the roadway monitoring installation. At block 1112, a Bluetooth® advertisement signal is transmitted from one or more Bluetooth® antennas at the roadway monitoring installation. At block 1114, Bluetooth® signals that are not received by all antennas in the installation are rejected. At block 1116, signal strengths of signals associated with unique Bluetooth devices that are received by all antennas in the installation are compared. The signals may contain identification numbers unique to the Bluetooth device that sent the signal. At block 1118, signals having the greatest signal strength as received by the Bluetooth® receiver in the first lane are singled out. At block 1120, user ID's of the singled out Bluetooth signals are compared with a registry of Bluetooth® ID's associated with the RFID transponder that was detected in block 1110. If a match is found, at block 1122, the matching ID is determined to have come from the same vehicle as the RFID transponder. Optionally, a record of all Bluetooth ID's with strongest signals in the first lane is made conditionally for later comparison at block 1124. If, on subsequent occasions any of these that Bluetooth IDs that were not previously associated with the RFID transponder are detected with a particular RFID transponder, an association may be recorded, or the RFID transponder owner may be queried whether he/she wants to add a new device to registered Bluetooth devices associated with their vehicle.

Figure 12:
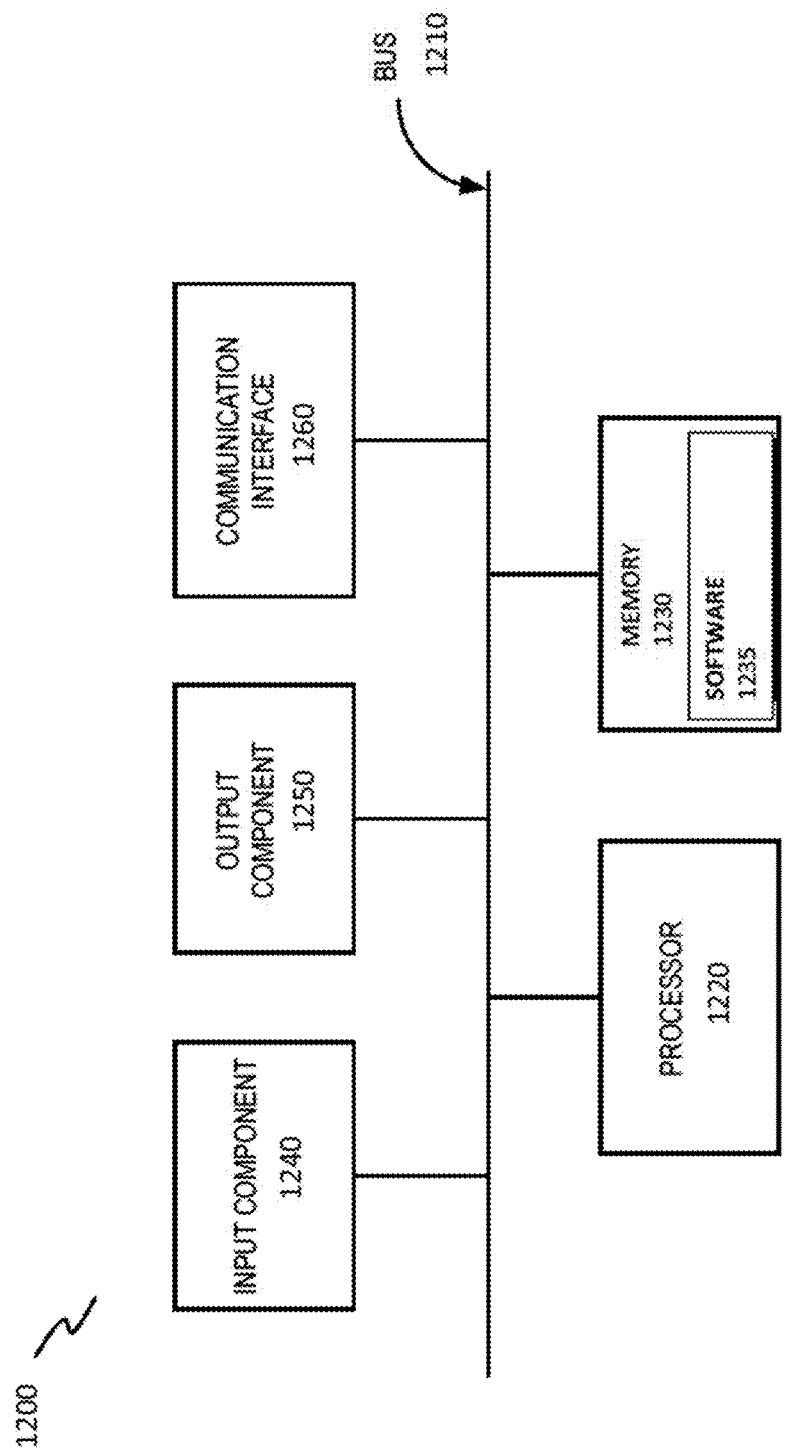
FIG. 12 is a block diagram of an exemplary controller.

FIG. 12 is a diagram illustrating exemplary physical components of a device 1200. Device 1200 may correspond to various devices within the above-described system, such as the controller 950, one of readers 930-936, etc. Device 1200 may include a bus 1210, a processor 1220, a memory 1230, an input component 1240, an output component 1250, and a communication interface 1260.

Bus 1210 may include a path that permits communication among the components of device 1200. Processor 1220 may include a processor, a microprocessor, or processing logic that may interpret and execute instructions. Memory 1230 may include any type of dynamic storage device that may store information and instructions, for execution by processor 1220, and/or any type of non-volatile storage device that may store information for use by processor 1220.

Software 1235 includes an application or a program that provides a function and/or a process. Software 1235 is also intended to include firmware, middleware, microcode, hardware description language (HDL), and/or other form of instruction. Additionally, for example, device 1200 may include software 1235 to perform tasks as described above with respect to FIG. 11.

Input component 1240 may include a mechanism that permits a user to input information to device 1200, such as a keyboard, a keypad, a button, a switch, etc. Output component 1250 may include a mechanism that outputs information to the user, such as a display, a speaker, one or more light emitting diodes (LEDs), etc.

Communication interface 1260 may include a transceiver that enables device 1200 to communicate with other devices and/or systems via wireless communications, wired communications, or a combination of wireless and wired communications. For example, communication interface 1260 may include mechanisms for communicating with another device or system via a network. Communication interface 1260 may include an antenna assembly for transmission and/or reception of RF signals. In one implementation, for example, communication interface 1260 may communicate with a network and/or devices connected to a network. Alternatively or additionally, communication interface 1260 may be a logical component that includes input and output ports, input and output systems, and/or other input and output components that facilitate the transmission of data to other devices.

Device 1200 may perform certain operations in response to processor 1220 executing software instructions (e.g., software 1235) contained in a computer-readable medium, such as memory 1230. A computer-readable medium may be defined as a non-transitory memory device. A non-transitory memory device may include memory space within a single physical memory device or spread across multiple physical memory devices. The software instructions may be read into memory 1230 from another computer-readable medium or from another device. The software instructions contained in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

Device 1200 may include fewer components, additional components, different components, and/or differently arranged components than those illustrated in FIG. 12. As an example, in some implementations, a display may not be included in device 1200. In these situations, device 1200 may be a "headless" device that does not include input component 1240. As another example, device 1200 may include one or more switch fabrics instead of, or in addition to, bus 1210. Additionally, or alternatively, one or more components of device 1200 may perform one or more tasks described as being performed by one or more other components of device 1200.

What is claimed is:

1. A system for monitoring vehicles for tolling, comprising:
   a radio frequency identification (RFID) interrogator;
   a plurality of RFID antennas configured to send and receive signals via said RFID interrogator, each RFID antenna associated with a portion of a roadway;
   a Bluetooth® antenna located in proximity with each of said RFID antennas;
   a controller configured to transmit a Bluetooth® advertisement via one or more of said Bluetooth® antennas; and
   a smart phone application configured to be executed by a smart phone located within a vehicle, wherein the smart phone is configured to receive Bluetooth® advertisements via the Bluetooth® antennas, and
   wherein the smart phone application is configured to collect data from the Bluetooth® advertisements received by the smart phone and to determine a lane of travel of the vehicle.

2. The system of claim 1, wherein the smart phone application is further configured to compare signal strength of the Bluetooth® advertisements received by the smart phone and determine the lane of travel based on Bluetooth® advertisements that have a highest signal level.

3. The system of claim 2, wherein the smart phone application is configured to determine the lane of travel based on a number of Bluetooth® advertisements having the highest signal level over a period of time.

4. The system of claim 1, wherein the smart phone application is further configured to identify the lane of travel based on information included in said Bluetooth® advertisements.

5. The system of claim 4, wherein the smart phone application is further configured to record said Bluetooth® advertisements with a time stamp.

6. The system of claim 1, wherein the smart phone application is further configured to identify the lane of travel based on an average signal strength associated with said Bluetooth® advertisements received from each of the Bluetooth® antennas.

7. The system of claim 6, wherein the smart phone application is further configured to determine an average signal strength of Bluetooth® advertisements associated with each lane of travel based on a number of strongest Bluetooth® advertisements associated with each lane of travel.

8. The system of claim 1, wherein said Bluetooth® antennas are mounted above a roadway.

9. The system of claim 1, wherein said Bluetooth® antennas are mounted at one or both sides of a roadway.

10. The system of claim 1, wherein the smart phone application is further configured to:
    identify toll charges based on the determined lane of travel of the vehicle.

11. The system of claim 10, wherein the smart phone application is further configured to:
    communicate with a toll authority or service provider associated with the toll authority to arrange for payment of the toll charges.

12. A method for tracking a vehicle at a vehicle monitoring site for tolling, the vehicle monitoring site having
    at least one lane of travel,
    a plurality of RFID antennas, each RFID antenna associated with a portion of a roadway,
    a plurality of Bluetooth® antennas, each Bluetooth® antenna associated with one of the plurality of RFID antennas, and a controller configured to transmit a Bluetooth® advertisement via one or more of the plurality of Bluetooth® antennas, the method comprising:

transmitting an RFID signal from a RFID transponder located in a vehicle at the vehicle monitoring site;

detecting the RFID signal via one or more of the plurality of RFID antennas at the vehicle monitoring site;

transmitting a Bluetooth® advertisement via the controller through one or more of the Bluetooth® antennas at the vehicle monitoring site;

receiving the Bluetooth® advertisement via a smart phone application configured to be executed by a smart phone located in the vehicle, wherein the smart phone application is configured to collect data from the Bluetooth® advertisement;

transmitting at least one response signal from the smart phone to one or more of the plurality of Bluetooth® antennas at the vehicle monitoring site, the at least one response signal comprising data collected from the Bluetooth® advertisement; and analyzing the at least one response signal received by the one or more of the plurality of Bluetooth® antennas via the smart phone application to determine a lane of travel of the vehicle at the vehicle monitoring site.

13. The method of claim 12, further comprising:

wherein the smart phone has an identification (ID) number associated with the at least one response signal transmitted from the smart phone, and eliminating the ID number from further analysis if the associated at least one response signal was not received by all of the plurality of Bluetooth® antennas.

14. The method of claim 13, further comprising:

if the ID number is not eliminated from analysis, comparing signal strengths of the associated at least one response signal received at each of the plurality of Bluetooth® antennas.

15. The method of claim 14, further comprising:

selecting the ID number associated with the at least one response signal that has the highest strength at the Bluetooth® antenna located in closest proximity to the first of the plurality of RFID antennas.

16. The method of claim 14, further comprising comparing the ID number with a database of known pairings of ID numbers and RFID transponders, and if the ID number and the RFID transponder match a known pairing from the database, determining that the smart phone associated with the ID number is located in the vehicle.

17. The method of claim 14, further comprising:

comparing the ID number with a database of known pairings of ID numbers and RFID transponders, if the ID number and the MD transponder do not match a known pairing from the database, determining that the smart phone associated with the ID number is not located in the vehicle, and conditionally associating the ID number and the RFID transponder in the database.

18. The method of claim 12, further comprising:

identifying a toll charge based on the determined lane of travel of the vehicle.

19. The method of claim 12, further comprising:

communicating with a toll authority or service provider associated with the toll authority to arrange for payment of the toll charge via the smart phone.

20. The method of claim 12, wherein transmitting a Bluetooth® advertisement via one or more of the Bluetooth® antennas at the vehicle monitoring site occurs in response to the detection of the RFID signal by the one or more of the plurality of RFID antennas.

* * * * *